Aug. 15, 1950 S. ROODNER Re. 23,255

UNDERGARMENT

Original Filed April 18, 1947

INVENTOR.

Sylvia Roodner

BY

Mock & Blum

ATTORNEYS

Reissued Aug. 15, 1950

Re. 23,255

UNITED STATES PATENT OFFICE 23,255

UNDERGARMENT

Sylvia Roodner, New York, N. Y.

Original No. 2,470,901, dated May 24, 1949, Serial No. 742,363, April 18, 1947. Application for reissue February 13, 1950, Serial No. 143,986

6 Claims. (Cl. 2—73)

Matter enclosed in heavy brackets [ ] appears in the original patent but forms no part of this reissue specification; matter printed in italics indicates the additions made by reissue

This invention relates to a new and improved lady's undergarment, and more particularly to an undergarment comprising a separate skirt or slip portion and a separate brassière portion, said slip or skirt portion and brassière portion being interconnected at the central front portion of said undergarment.

Among the objects of the invention is the provision of an undergarment having separate, interconnected brassière and skirt portions which will conform to the body of the wearer and which will permit free and unconstricted movement to the body and arms of the wearer without displacement and without riding up or down on the body of the wearer.

Another object of the invention is the provision of an undergarment of the character indicated having a slip portion terminating at approximately the waistline of the wearer and provided with an elastic band therearound to retain said slip portion in adjusted position, a brassière portion being disposed above the slip portion and spaced therefrom, said brassière portion being interconnected with said slip portion by a connecting panel at the front of the undergarment in such a manner as to substantially prevent upward displacement or riding of the slip portion or downward displacement of the brassière portion of the undergarment.

A further object of the invention is the provision of an undergarment of the character indicated provided with a slip portion having no side seams so as to contribute greatly to the durability and wearing qualities of the undergarment and to minimize the possibility of tearing.

Still another object of the invention is to provide a two-in-one undergarment having only one pair of shoulder straps whereas two pairs of shoulder straps would be normally required if the article were not a combination undergarment. Such elimination of one pair of shoulder straps affords greater comfort to the wearer.

Another object of the invention is the provision of a single undergarment which, while combining both the functions of a slip and brassière, is ideally suited for wear in warm weather, by reason of the spacing of the brassière portion above the top of the slip portion at the waistline of the wearer, except at the interconnecting panel disposed at the central front portion of the undergarment, said interconnecting panel concealing the corset or girdle that may be worn.

The foregoing objects as well as additional objects and advantages of the invention will be readily apparent in the course of the following detailed description taken in connection with the accompanying drawing, which illustrate preferred embodiments of the invention, and wherein.

Figure 1:
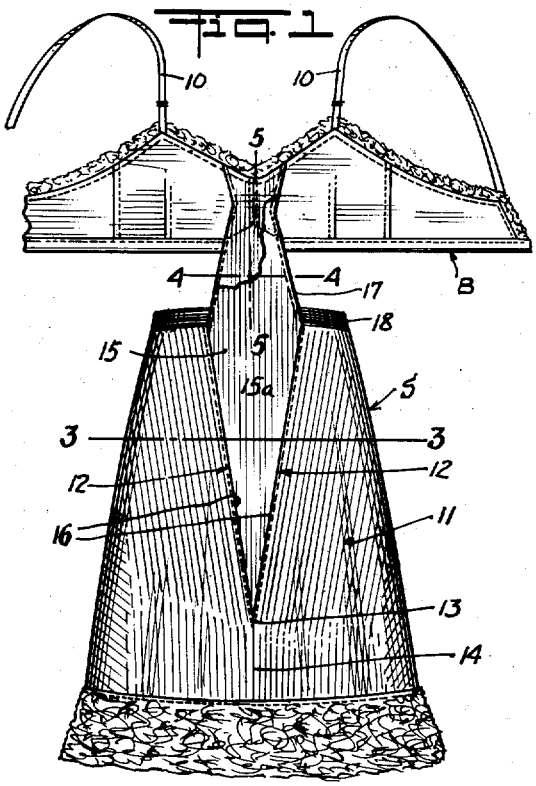
Fig. 1 is a front elevation of an undergarment embodying the features of the invention.

In the drawing, the brassière portion of the undergarment is generally indicated by the reference letter B and the slip or skirt portion is generally indicated by the letter S.

Brassière B may be of any suitable design and carries the usual supporting shoulder straps 10.

Slip or skirt portion S comprises a main body panel 11 which is made from a single blank of material in which the median line of the main body portion is on the bias and the upper front side edges are on the "straight" of the material, that is, parallel to the warp [and weft respectively]. In forming the main body panel 11, the single blank of material is folded on the bias forming substantially a triangle with the two adjacent free side edges on the straight of the material, the folded side edge on the bias and two adjacent free lower edges. The material is then cut concave from the free side edges to the folded edge, near the apex, to form the waistline, then the free side edges near the lower edges are cut at a slight angle from the straight side edges to the lower edges and then the lower portion of the folded material is cut convex from the free side edges to a predetermined point near the lower end of the folded edge to form the hem line. In this manner, that part of the material so cut which becomes the front portion of the skirt is on the straight, and that part which becomes the back of the skirt is on the bias, when the cut blank is assembled into skirt form.

Figure 3:
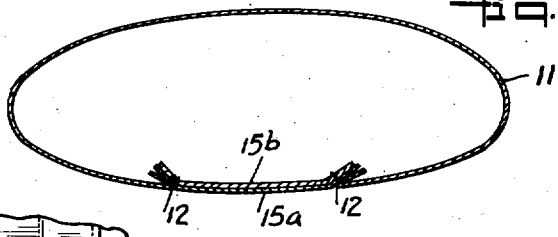
Fig. 3 is a sectional view taken on line 3—3 of Fig. 1.
Figure 5:
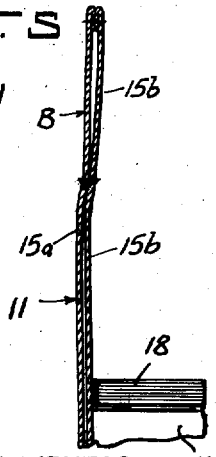
Fig. 5 is a sectional view taken on line 5—5 of Fig. 1.

As clearly indicated in Fig. 3, by cutting panel 11 from a single piece of material to form the body of skirt portion S, the presence of side seams is eliminated. Said panel 11 is cut to present, at the front of skirt portion S, a pair of upwardly divergent edges 12 extending from a point 13 above the bottom edge of slip portion S to the upper edge of said slip portion at approximately the waistline of the wearer. The edges of panel 11 below point 13 at the intersection of edges 12 are substantially vertical and may be stitched together along line 14 to partially form slip portion S.

Figure 2:
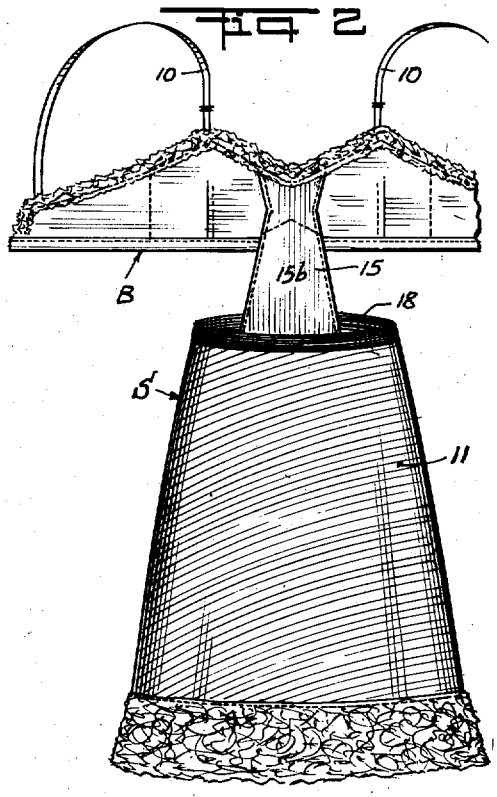
Fig. 2 is a rear view partly in elevation and partly in perspective, of the undergarment of Fig. 1.

An intermediate front panel 15 having a pair of upwardly divergent edges 16 may be secured to main panel 11 by stitching each edge 16 to a respective edge 12 of said main panel. Intermediate front panel 15 serves additionally as a connecting panel for the brassière portion B of the undergarment in a manner to be fully described and is provided with an extension 17 extending upwardly above the top edge of slip portion S. Panel 15 is preferably formed with an outer layer 15a and an inner layer 15b as shown in Figs. 1 and 2. Main body panel 11 is preferably provided at the top edge thereof with an elastic band or strip 18 for supporting and maintaining slip portion S in adjusted position on the body of the wearer.

Brassière portion B of the undergarment is preferably spaced from and connected with slip portion S by means of upward extension 17 of panel 15. As shown in Figs. 1 and 2, this may be conveniently accomplished by stitching outer layer 15a of said extension to the outside of brassière B and stitching inner layer 15b to the inner face of said brassière.

The manner in which brassière portion B and slip portion S are interconnected by means of panel 15, which forms a part of the body of the slip, and its extension 17 is an extremely important feature of the invention and combines with the other features of the invention to prevent upward displacement or riding of slip portion S and downward displacement of brassière portion B while allowing free and unconstricted movement to the body of the wearer. Thus, by providing an interconnecting panel 15 having an upward extension 17 and a pair of divergent edges extending far down into the body of slip portion S, any upward pull which might be exerted on said slip portion is diffused and distributed over a large area rather than localized at a point on the top edge of said slip portion with the practical result, as observed in wearing the undergarment, that there is no upward displacement of slip portion S or downward displacement of brassière portion B.

In addition to the inherent advantages of the design and construction of the undergarment residing in the provision of a separate brassière portion B spaced from and interconnected with slip portion S to afford a greater degree of freedom of motion to the wearer, the arrangement ideally adapts the undergarment for use in warm weather by having free the midriff of the wearer.

Figure 6:
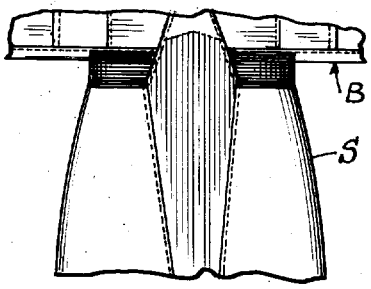
Fig. 6 is a fragmentary view of a modified form of undergarment which, while embodying the features and advantages of the invention, has contiguous slip and brassière portions adapting the undergarment for wear in average or cold weather.
Figure 4:
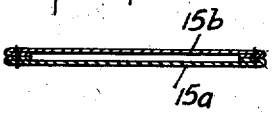
Fig. 4 is a sectional view taken on line 4—4 of Fig. 1.

The modification of the invention illustrated in Fig. 6 is similar in all respects to the embodiment initially described except that the space between the top edge of the slip portion S and the bottom edge of brassière portion B has been reduced until said edges are substantially contiguous. This is accomplished by widening elastic waist band 18 of slip portion S. This form of the invention adapts the undergarment for use in average or cold weather by covering the midriff of the wearer while retaining the advantages of the undergarment which have been elaborated hereinabove. In addition, the widened elastic waist band 18 of slip S serves to properly hold the midriff section of the wearer thereby preventing any bulges and eliminating the necessity of a long brassière.

Since certain modifications may be made in the undergarment of the invention without departing from the scope thereof, it is intended that all matter contained in the foregoing description and shown in the accompanying drawing be interpreted merely as illustrative and not in a limiting sense.

I claim:

1. An undergarment of the character described comprising a brassière portion and an attached skirt portion, said skirt portion comprising a main body panel and an intermediate wedge shaped front panel, said main body panel comprising a fabric section in which the median line is on the bias and the upper side edge portions are on the "straight" of the material and positioned at the front of the garment, the said upper side edge portions diverging upwardly toward the waist line of the garment and attached to the side edges of the intermediate wedge shaped front panel, the lower side edge portions of the main body panel being secured together below the wedge shaped front panel.

2. An undergarment in accordance with claim 1 characterized by said wedge shaped panel having an upper extension forming the central portion of the brassière.

3. An undergarment in accordance with claim 1 in which the said main body portion terminates at the waist line, and means for supporting the upper edge of the main body panel at the waist line in spaced relation to the lower edge of the brassière portion.

*4. A garment of the character described comprising a brassière portion and an attached skirt portion, said skirt portion comprising a main body panel portion and an intermediate wedge-shaped front panel connected with the brassière portion, said wedge-shaped front panel being positioned at the front of the garment with the lateral edges thereof diverging upwardly from a point in the lower portion of the skirt portion toward the waist line of the garment and attached to the main body panel.*

*5. A garment of the character described comprising a brassière portion and an attached skirt portion, said skirt portion comprising a main body panel and an intermediate wedge-shaped front panel connected with the brassière portion, said wedge-shaped front panel being positioned at the front of the garment with the lateral edges thereof diverging upwardly from a point spaced above the lower edge of the garment, said main body panel comprising a fabric section with laterally spaced opposing inner side edges of the upper portion of said body panel joined directly to the diverging lateral edges of the wedge-shaped front panel and with the inner edges of the lower portion of said body panel joined directly together below the front panel by a seam extending downwardly from the point of the wedge-shaped front panel substantially to the lower edge of the garment.*

*6. A garment of the character described comprising a brassière portion and an attached skirt portion, said skirt portion comprising a main body panel and an intermediate wedge-shaped front panel, said wedge-shaped front panel being positioned at the front of the garment with the lateral edges thereof diverging upwardly from a point spaced above the lower edge of the gar-*

*ment, said main body panel comprising a fabric section with laterally spaced opposing inner side edges of the upper portion of said body panel joined directly to the diverging lateral edges of the wedge-shaped front panel and with the inner edges of the lower portion of said body panel joined directly together below the front panel by a seam extending downwardy from the point of the wedge-shaped front panel substantially to the lower edge of the garment, said front panel extending upwardly above the waist line of the garment and joined to the brassière portion.*

SYLVIA ROODNER.

REFERENCES CITED

The following references are of record in the file of this patent, or the original patent:

UNITED STATES PATENTS

| Number | Name | Date |
|---|---|---|
| 2,042,305 | Goodman | May 26, 1936 |
| 2,056,025 | Thomas | Sept. 29, 1936 |
| 2,062,150 | Sussberg | Nov. 24, 1936 |
| 2,286,938 | Stegman | June 16, 1942 |